United States Patent [19]

Carey et al.

[11] 4,154,608
[45] May 15, 1979

[54] PRODUCTION OF HIGH PURITY IRON POWDER

[75] Inventors: Curtis D. Carey; Martin C. Kuhn; Margaret K. Witte, all of Tucson, Ark.

[73] Assignee: UOP Inc., Des Plaines, Ill.

[21] Appl. No.: 925,897

[22] Filed: Jul. 19, 1978

[51] Int. Cl.² .................. C21B 1/08; C22B 61/00
[52] U.S. Cl. .................. 75/101 R; 75/0.5 BA; 75/0.5 AA; 75/121; 423/152
[58] Field of Search ........ 75/0.5 AA, 0.5 BA, 101 R, 75/121; 423/152

[56] References Cited

U.S. PATENT DOCUMENTS

| | | | |
|---|---|---|---|
| 1,237,765 | 8/1917 | Eustis | 75/121 X |
| 2,663,632 | 12/1953 | Oppegaard | 75/0.5 BA X |
| 2,728,655 | 12/1955 | Brundin | 75/0.5 BA |
| 2,759,808 | 8/1956 | Kuzmick et al. | 75/0.5 BA |
| 3,211,524 | 10/1965 | Hyde et al. | 75/121 X |
| 3,347,659 | 10/1967 | Volk et al. | 75/0.5 BA |
| 3,585,023 | 6/1971 | Vlaaty et al. | 75/1 R X |
| 3,966,454 | 6/1976 | Ito et al. | 75/0.5 BA |
| 3,967,986 | 7/1976 | Rau et al. | 75/0.5 BA X |
| 4,054,443 | 10/1977 | Jaco | 75/0.5 BA |

Primary Examiner—G. Ozaki
Attorney, Agent, or Firm—James R. Hoatson, Jr.; Raymond H. Nelson; William H. Page, II

[57] ABSTRACT

High purity iron powder may be obtained by treating an iron bearing source which contains impurities such as silica along with minor amounts of aluminum, calcium and magnesium to a series of steps which include grinding the iron bearing source followed by subjecting the ground source to a caustic leach at an elevated temperature and pressure. Thereafter the soluble impurities may be separated from the residue, the latter then being reduced by treatment with hydrogen at an elevated temperature and pressure to convert the iron to the metallic form.

11 Claims, 1 Drawing Figure

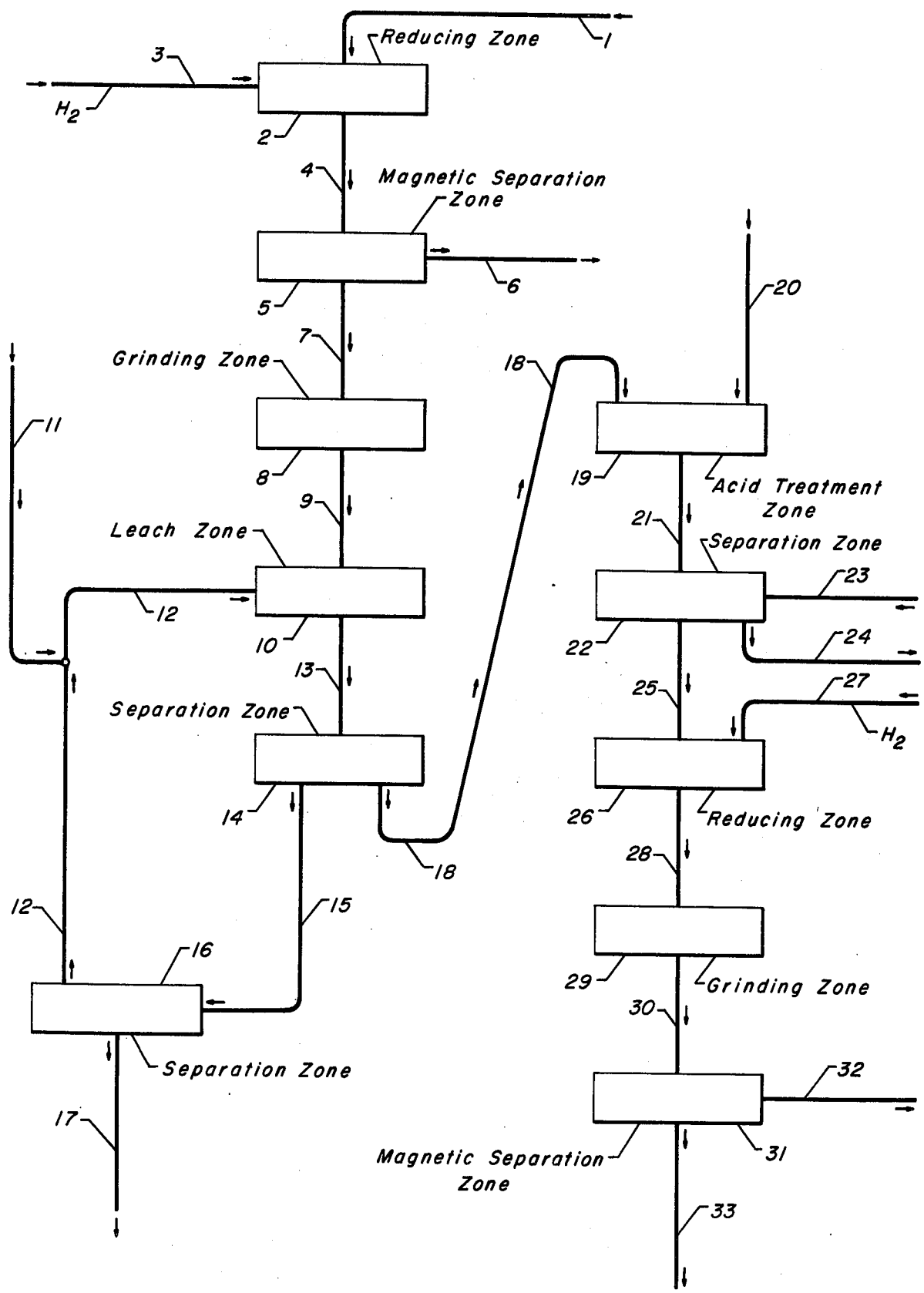

PRODUCTION OF HIGH PURITY IRON POWDER

BACKGROUND OF THE INVENTION

Heretofore various processes have been employed for obtaining metallic iron by the reduction of iron bearing sources such as ore. For example, U.S. Pat. No. 3,585,023 discloses a process in which iron ore is mixed with a reducing agent such as a fossil fuel and forming the mixture into agglomerates. The thus formed agglomerates are then charged to an enclosed environment which utilizes hot solid inert particles as the heating medium, said enclosed environment being maintained in the absence of oxygen. Upon completion of the desired reduction, the particles and agglomerates are separated and the reduced agglomerates are allowed to partially cool before being exposed to the atmosphere. Following this the reduced agglomerates are then recovered. Other methods utilize a heating and magnetic separation to effect a production of iron powder as well as effecting a physical separation by crushing, scalping, air cleaning, and screening followed by subjecting the ore to a high intensity induced magnetic field. U.S. Pat. No. 2,728,655 discloses a method for producing iron powder with a low silica content in which an iron containing material in finely divided form is admixed with a solid ash-containing carbonaceous reducing agent. The mixture is then heated to complete the reduction of the iron containing material followed by cooling and recovery of the iron content.

As will hereinafter be shown in greater detail, it has now been discovered that by subjecting the iron bearing source to a series of steps it is possible to obtain an iron powder which will contain less than 0.1% silica, which is considerably less than the silica content of iron which remains after the normal treatment of iron bearing sources.

This invention relates to an improved process for the recovery of metallic iron from an iron bearing source. More specifically, the invention is concerned with the process for obtaining a high purity iron powder which is substantially free of silica and other impurities, and which may then be utilized for a variety of powder metallurgy applications.

Heretofore, iron powder which is suitable for use in powder metallurgy applications was obtained from atomized iron powder which is relatively expensive to produce. Powdered iron which is substantially free of impurities such as silica, for example, iron which possesses a silica content less than about 0.1%, may be used for the production of certain-types of steel, in which the powder is directly rolled into sheet steel. In addition, another use of high purity iron powder is in molding in which the iron powder is directly pressed into different configurations for use as a particular part of various apparatuses, rather than by casting which is the usual method for obtaining parts which possess a particular configuration.

It is therefore an object of this invention to provide a process for obtaining high purity metallic iron.

A further object of this invention is to provide a process for obtaining iron powder which possesses a silica content of less than about 0.1%.

In one aspect an embodiment this invention resides in a process for the recovery of metallic iron from an iron bearing source which comprises the steps of grinding said iron bearing source, subjecting the ground iron bearing source to a caustic leach at an elevated temperature and presusre, separating the impurities from the caustic leach residue, reducing the iron in said caustic leach residue by treatment with hydrogen at an elevated temperature and pressure, and recovering the resultant metallic iron.

A specific embodiment of this invention is found in a process for the recovery of metallic iron from an iron bearing source which comprises the steps of reducing an iron concentrate by treatment with hydrogen at a temperature in the range of from about 700° to about 1300° F. and a pressure in the range of from about atmospheric to about 500 psi, thereafter subjecting the reduced source to at least one magnetic separation step to separate impurities such as silica therefrom, grinding the iron bearing source to a desired particle size, subjecting the ground iron bearing source to a caustic leach by treatment with sodium hydroxide at a temperature in the range of from about 300° to about 400° F. and a pressure in the range of from about 200 to about 400 psi to solubilize impurities such as silica, aluminum, calcium and magnesium, filtering the leach mixture, washing the residue with a water solution containing hydrochloric acid, filtering the solution, thereafter subjecting the residue to a second reduction step by treatment with hydrogen at a temperature in the range of from about 700° to about 1900° F., grinding the reduced iron to a particle size in the range of from about −40 mesh to about +270 mesh, thereafter subjecting the ground iron to at least one magnetic separation step to further separate any impurities which may still be present, and recovering the purified iron powder.

Other objects and embodiments will be found in the following detailed description of the present invention.

As hereinafter set forth, the present invention is concerned with an improvement in a process for obtaining high purity iron powder from an iron bearing source. By effecting the process in a series of steps hereinafter set forth, it has been found possible to obtain iron powder which contains less than about 0.1% silica, thus enabling the powder to be used for a variety of powder metallurgic purposes. Several advantages in the treatment of the iron bearing source when utilizing the various steps of the process of the present invention will become apparent when discussing the process. The iron bearing source which may be utilized as the feed stock for the present invention will comprise hematite ($Fe_2O_3$) and magnetite ($Fe_3O_4$) concentrates which are widely available from many sources, the most common source which is presently available being hematitic in nature. However, the concentrates usually contain a relatively large amount of silica ($SiO_2$) as the major gangue mineral in amounts ranging from about 1 to about 7%. In addition, other impurities are also present such as minor amounts of aluminum, calcium, magnesium, etc. In order to be able to use iron powder for various metallurgical purposes, it is necessary to remove the impurities, especially silica, and reduce the concentration of the silica to less than about 0.1%. To effectively attain the desired result, the iron bearing source such as hematite must be processed through a series of steps in order to reduce the iron oxide concentrate to pure iron.

The process of the present invention is effected by subjecting an iron bearing source such as hematite or magnetite to a grinding process whereby the iron ore is reduced to a desired particle size. The particle size will be such that a major portion of the silica is liberated from the iron and therefore the desired particle size should be about −200 mesh, this size being sufficient to effectively separate the silica particles from the ore. Thereafter the ground ore is subjected to a caustic leach at an elevated temperature and pressure. The leach solution which is utilized to effect a separation of silica will comprise an aqueous sodium hydroxide solution which contains from about 100 to about 200 grams/liter of sodium hydroxide, although a lesser amount or greater amount of sodium hydroxide may be employed if so desired. The leach is effected at temperatures which may range from about 300° to 400° F. at an implied pressure in the range of from about 200 to about 400 psi. After treating the ore with the caustic solution for a period of time which may range from about 0.5 up to about 4 hours or more in duration, the silica particles in the leach head material will form sodium silicate of varying composition and which will be soluble in nature. The caustic treatment of the ore will result in the reduction of the silica content present in the original ore down to less than 1%. Following the treatment of the ore within the reaction parameters set forth above, the solid ore which may also contain insoluble silicates of aluminum, calcium, and magnesium, will be separated from the leach liquor by conventional means such as filtration, centrifugation, decantation, etc. The residue may then be subjected to a reducing process in which the iron is treated with hydrogen at an elevated temperature and pressure for a predetermined period of time in either a one or two step reduction process. In one embodiment the iron ore is reduced by treatment with hydrogen at a pressure in the range of atmospheric to about 500 psi in a two step process, the first step being effected at a temperature in the range of from about 700° to about 1300° F. The oxygen level in the iron will be reduced to less than 5%; however, the iron oxide particles at this point in the process are highly pyrophoric and therefore must be protected by an inert atmosphere which is provided for by the presence of nitrogen before being subjected to the second stage of the reduction step. The second stage reduction is effected at temperatures ranging from about 1600° to about 1900° F. and serves to completely reduce the iron oxide to iron powder. In addition to reducing the iron oxide to metallic iron, the second stage of the reduction process also serves to sinter the surface of the iron particles in such a manner so that the pyrophoricity of the particles is eliminated and therefore the iron particles may be exposed to the atmosphere with the concurrent elimination of the necessity of an inert gas such as nitrogen being present.

It is also contemplated within the scope of this invention that other steps may be employed in addition to those hereinbefore enumerated in order to insure the fact that the final silica amount in the product is less than 0.1%. For example, the iron concentrate which may contain up to about 7% silica may be subjected to a reduction step which is effected by treating the iron concentrate with hydrogen at a temperature in the range of from about 700° to about 1300° F. and at pressures ranging from atmospheric to about 500 psi. When utilizing this step the hematite will be reduced to magnetite. In addition to using pure hydrogen, it is also contemplated that other reducing agents such as a mixture of hydrogen and carbon monoxide may also be employed. Following the reduction of the hematite to magnetite, the iron which is present in the ore is highly magnetic and therefore the bulk of the silica contaminant is susceptible to being removed prior to caustic leaching, thus reducing the consumption of the caustic during the leaching operation. The removal of the silica gangue material from the magnetite may be accomplished by passing the ore through a permanent magnet separator. If so desired, the ore may be passed through this separator more than once; for example, the ore may be passed through the separator and recycled up to about three or four times, thus insuring a more complete separation of the magnetic iron product from the silica. The silica particles which are separated from the magnetite will tend to be the largest particles present and thus the silica which remains in the magnetite will be in the shape of rather fine particles, said fine particles being more susceptible to the caustic leach of the ore.

Following the magnetic separation of the large silica particles from the magnetite the latter may then be ground in a ball mill to a desired particle size which is suitable for the caustic leaching stage of the process. For example, the product may be ground so that the particles are present in a range of from about −100 to about +270 mesh. After grinding the ore to the desired particle size, it is then subjected to a caustic leach in a manner similar to that hereinbefore set forth whereby the soluble sodium silicates are separated from the insoluble magnetite. The separation of the iron from the soluble sodium silicates is facilitated inasmuch as magnetite leach residue filters at a rate which is more rapid than the hematite leach residue, thus permitting the separation step to be effected in a more advantageous manner. Following the separation of the solid magnetite, it is then washed with hot water at a temperature of from about 150° to about 200° F. to completely remove any traces of caustic leach liquor which may still be present on the ore.

Another step which may be employed to permit the recovery of a pure iron product is subjecting the magnetite solids from the filtration step, which may still contain some metal silicates such as aluminum silicate, calcium silicate, magnesium silicate, etc., as well as any sodium silicate which may have reprecipitated during the separation step, to the action of a weak acid solution. The acid wash is preferably effected at ambient temperature and atmospheric pressure for a period of time which may range from about 0.5 up to about 5 hours or more, the duration of the wash being that which is sufficient to dissolve any silica compounds which may be present. In the preferred embodiment of the invention, the acid wash comprises an aqueous hydrochloric acid solution which may contain from about 2 to about 10% hydrochloric acid, although it is also contemplated within the scope of this invention that other acids such as sulfuric acid, nitric acid, etc., may also be employed, but not necessarily with equivalent results. Upon completion of the residence time in the acid bath, the repulped solids are then filtered utilizing any conventional filtration equipment or, if so desired, the separation of the acid bath from the solids may be accomplished by other means such as decantation, etc. As in the previous step, the residue is again washed with hot water, dried and thereafter the residue is subjected to a second reduction step.

As was also previously descirbed, the reduction of the residue may be accomplished in one or more stages. The first stage is effected by treating the magnetite with pure hydrogen at a temperature in the range of from about 700° to about 1300° F. while the second stage is effected in the presence of hydrogen at higher temperatures ranging from about 1600° to about 1900° F. The result of this two stage reduction will be to lower the oxygen content of the iron powder to approximately 0.2%. Upon cooling the residue after reduction thereof, the residue will be in an agglomerated form and therefore must be subjected to a grinding step whereby the powder is reduced to a suitable particle size. The grinding of the iron to the desired particle size may be accomplished using any conventional grinding equipment such as a ball mill which will enable the operator to adjust the particle size to any mesh, said size being dependent upon the end use of the material.

Following the grinding of the iron to form the desired particle size, the powder may then be subjected to a second series of magnetic separations which will serve as a clean-up stage for any foreign particles which may still be present in the iron powder. After passage through the magnetic separator for at least one pass and preferably up to about three passes, the iron powder which is recovered will contain less than 0.1% silica. The silica compounds which remain in the iron powder in the amount hereinbefore set forth will not be discrete in form, but will be of submicron particle size and will be very finely dispersed throughout the powder. By virtue of being in submicron particle size, the finely dispersed silicon compound will not be detrimental for the use of iron powder in metallurgical applications.

By utilizing the steps hereinbefore set forth, it is possible to extract at least 99.5% of the silica with a minimal loss of iron during the process. In addition, the oxygen content of the powder will also be minimal in nature and will not interfere with the desired uses of the iron powder.

BRIEF DESCRIPTION OF THE DRAWING

The present invention will be further illustrated with reference to the accompanying drawing which sets forth a flow diagram of one embodiment of the process of this invention. It is to be understood that various valves, pumps, heat transfer means, etc., have been eliminated as not being essential to the complete understanding of the invention. However, the utilization of these as well as other similar appurtenances will become obvious as the drawing is described.

The iron concentrate which may contain up to about 7% silica is charged through line 1 to a reducing zone 2. In reducing zone 2, the ore is contacted with hydrogen which is admitted through line 3 at a pressure which may range from about atmospheric to about 500 psi. In zone 2 the ore is reduced at a temperature which may range from about 700° to about 1300° F. for a period of time which is sufficient to convert the hematite in the ore concentrate to magnetite. Upon completion of the reduction of the ore to magnetite, it is withdrawn from reducing zone 2 through line 4 and passed to magnetic separation zone 5. After separating the magnetic iron ore from silica the latter is withdrawn from line 6 for disposal. The magnetite is then withdrawn from magnetic separation zone 5 through line 7 and passed to grinding zone 8 wherein the concentrate is ground to the desired particle size. After attaining the desired particle size, the ore is withdrawn from grinding zone 8 through line 9 and passed to leach zone 10 wherein it is contacted with a caustic solution comprising a sodium hydroxide solution. The sodium hydroxide solution is charged through lines 11 and 12 to leach zone 10. In leach zone 10 the ore is treated at an elevated temperature which may range from about 300° to about 400° F. under an implied pressure of from about 200 to about 400 pounds per square inch (psi) for a period of time sufficient to solubilize the silica as sodium silicate. The leach mixture is withdrawn from leach zone 10 and passed through line 13 to separation zone 14 whereby the separation of the solid leach residue from the soluble sodium silicate is effected by any conventional means. The leach liquor containing the soluble sodium silicates is withdrawn from separation zone 14 through line 15 and passed to a second separation zone 16. In separation zone 16 the leach liquor containing sodium silicate may be contacted with calcium oxide to regenerate the sodium hydroxide caustic solution with a concomitant formation of calcium silicate. The calcium silicate is removed from separation zone 16 through line 17 while the regenerated caustic solution is recycled to leach zone 10 through line 12. In line 12, it is commingled with any make-up sodium hydroxide solution which may be required, the make-up solution being admitted through line 11.

The solid magnetite which has been separated from the leach liquor is withdrawn from separation zone 14 through line 18 and passed to acid treatment zone 19. In acid treatment zone 19 the magnetite is washed with an acid solution, preferably in a weak aqueous form, which is admitted to zone 19 through line 20, said acid wash of the magnetite preferably being effected at atmospheric pressure and ambient temperature. After treatment in the acid wash zone for a period of time sufficient to solubilize any other impurities such as aluminum, calcium, magnesium, etc., the solution is withdrawn from acid treatment zone 19 through line 21 and passed to separation zone 22. In separation zone 22 the solid magnetite is washed with water admitted through line 23 and separated from the soluble impurities which are withdrawn from line 24 for disposal. Following separation from the soluble impurities, the magnetite is withdrawn through line 25 and passed to reducing zone 26. In reducing zone 26 the magnetite is treated with hydrogen which is admitted through line 27 in one or more stages at temperatures which may range from about 700° to about 1900° F. Upon completion of the reduction step the metallic iron is withdrawn from reducing zone 26 through line 28 and passed to grinding zone 29. In grinding zone 29, which may comprise a ball mill or any other form of grinding apparatus, the solid iron powder which has resulted from the treatment in the reducing zone is ground to the desired particle size suitable for use in metallurgical applications. After being ground to the desired particle size the particles are withdrawn from grinding zone 29 through line 30 and passed to a second magnetic separation zone. In magnetic separation zone 31 the iron powder is subjected to a clean-up stage which may be effected by any number of steps to remove any non-magnetic foreign particles which may still be present in the iron powder. The foreign particles are withdrawn from magnetic separation zone 31 through line 32 while the desired high purity iron powder is withdrawn through line 33 for storage.

While the above description is indicative of a batch type operation, the process of the present invention may also be effected in a continual manner by continuously charging an ore concentrate such as hematite to a reducing zone wherein it is treated with hydrogen under conditions which are similar in nature to those hereinbefore set forth. After passage through the reducng zone the resulting magnetite is continuously withdrawn and passed to a magnetic separation zone wherein the non-magnetic impurities which are present in the concentrate are separated from the magnetic iron ore. The separated magnetic iron ore is then continuously charged to a grinding zone and after having been ground to the desired particle size is continuously withdrawn from this zone and passed to a leaching zone. In the leaching zone the ore is contacted with a caustic solution at operating conditions of temperature and pressure and after passage through this zone for a predetermined period of time is continuously passed to a separation zone wherein the soluble impurities such as sodium silicate are separated from the solid magnetite. The solid magnetite is again continuously withdrawn from this separation zone and passed to an acid treatment zone wherein it is contacted with an aqueous solution of an acid such as hydrochloric acid. After passage through the treatment zone for a predetermined period of time the solution is continuously withdrawn and passed to a second separation zone wherein the soluble impurities are separated from the ore. The solid ore is continuosly withdrawn from the separation zone and passed to a reducing zone wherein it is again subjected to the action of hydrogen at conditions which are sufficient to convert the magnetite to metallic iron. The reduced ore which is in an agglomerate form is continuously withdrawn and passed to a second grinding zone wherein it is ground to the desired particle size, and after having reached this size is continuously withdrawn and passed to a second magnetic separation zone wherein any impurities or foreign material which is still formed in the comminuted ore are removed while the iron powder is recovered.

The following example is given for purposes of illustrating the process of this invention. However, it is to be understood that this example is merely for purposes of illustration and that the present process is not necessarily limited thereto.

EXAMPLE

An iron ore concentrate which contains 6.3% silica was reduced by treatment with hydrogen at a temperature of about 850° F. and atmospheric pressure until the hematite was reduced to magnetite.

The magnetite product was separated from the silica gangue material by three passes through a permanent magnetic separator, the original 6.3% silica in the starting material being reduced by means of the magnetic separation to about 0.75% silica.

The magnetite product which was recovered from the magnetic separator was ground in a ball mill to a particle size which ranged from −100 mesh to +270 mesh. Following this the ground magnetite was leached in a pressure autoclave with a caustic solution which contained about 150 grams/liter of sodium hydroxide, said leach operation being effected at a temperature of 400° F. and a pressure of 275 psi, the silica particles in the lach head material reacting with the caustic to form soluble sodium silicate. The caustic leach slurry was filtered using a plate and frame filter and the filtration residue which contained from about 0.2 to about 0.3% impurities including aluminum silicate, calcium siliate, magnesium silicate and silica was washed with hot water, which had a temperature of about 150°F., to remove any traces of caustic leach liquor which may still have been present on the solids.

The solids from the caustic leach were then treated with a weak hydrochloric acid solution containing about 5 wt. %, said washing being effected at room temperature for a period of about 30 minutes. The insoluble silicates which had precipitated from the lixiviant during the leaching and filtration steps were dissolved in the hydrochloric acid along with about 2% of the iron. At the end of the 30 minute period the hydrochloric acid leach slurry was filtered and the residue again washed with hot water which had a temperature in the range of about 150° to about 200° F. At this point, the silica content of the magnetite comprised 0.08%.

The washed magnetite was then treated with pure hydrogen at a temperature in the range of from about 700° to about 1300° F. to lower the oxygen level in the ore to less than 5%. Upon completion of the reduction, the temperature was increased to a range of from about 1600° to about 1900° F. whereby the iron oxide was completely reduced to an iron powder.

After coolng, the iron powder which resulted from the reduction was in an agglomerated form and was ground to the desired particle size in a ball mill, the resultant particles being in a range of from about −40 mesh to about +270 mesh. After reaching the desired particle size, the iron powder was subjected to three passes through a permanent magnetic separator whereby any foreign particles which may still have been present in the iron powder and freshly liberated impurities were separated. The iron powder which was recovered had a silica content of from about 0.03 to about 0.06% and was suitable for use in powder metallurgical applications.

We claim as our invention:

1. A process for the recovery of metallic iron from an iron bearing source which comprises the steps of:
   (a) grinding said iron bearing source;
   (b) subjecting the ground iron bearing source to a caustic leach at an elevated temperature and pressure;
   (c) separating the impurities from the caustic leach residue;
   (d) reducing the iron in said caustic leach residue by treatment with hydrogen at an elevated temperature and pressure; and
   (e) recovering the resultant metallic iron.

2. The process as set forth in claim 1 in which said caustic leach is effected at a temperature in the range of from about 300° to about 400° F. and a pressure in the range of from about 200 to about 400 pounds per square inch.

3. The process as set forth in claim 1 in which the reduction of said iron is effected at a temperature in the range of from about 700° to about 1900° F. and a pressure in the range of from about atmospheric to about 500 pounds per square inch.

4. The process as set forth in claim 1 further characterized in that said iron bearing source is reduced by treatment with hydrogen at an elevated temperature and pressure prior to being ground to the desired particle size.

5. The process as set forth in claim 4 in which said elevated temperature is in a range of from about 700° to about 1300° F. and a pressure in the range of from about atmospheric to about 500 pounds per square inch.

6. The process as set forth in claim 4 further characterized in that the reduced iron bearing source is subjected to at least one magnetic separation step to separate impurities therefrom.

7. The process as set forth in claim 1 further characterized in that the caustic leach residue is treated with an acid to remove impurities therefrom.

8. The process as set forth in claim 7 in which said acid is hydrochloric acid.

9. The process as set forth in claim 7 further characterized in that the residue from said acid treatment is reduced by treatment with hydrogen at a temperature in the range of from about 700° to about 1900° F.

10. The process as set forth in claim 9 further characterized in that the reduced iron is ground to a desired particle size in the range of from about −40 mesh to about +270 mesh.

11. The process as set forth in claim 10 further characterized in that the ground iron is subjected to at least one magnetic separation step to remove impurities therefrom.

* * * * *

UNITED STATES PATENT AND TRADEMARK OFFICE
CERTIFICATE OF CORRECTION

PATENT NO. : 4,154,608
DATED : May 15, 1979
INVENTOR(S) : Curtis D. Carey et al.

It is certified that error appears in the above-identified patent and that said Letters Patent are hereby corrected as shown below:

On The Title Page Item 75, "Tucson, Ark." should read -- Tucson, Ariz. --.

Signed and Sealed this

Twenty-fourth Day of July 1979

[SEAL]

Attest:

LUTRELLE F. PARKER

*Attesting Officer*   *Acting Commissioner of Patents and Trademarks*